United States Patent
Schofield et al.

(10) Patent No.: US 7,810,708 B1
(45) Date of Patent: Oct. 12, 2010

(54) COMBINATION MAILBOX HOUSING AND PEDESTAL-PLANTER ASSEMBLY MADE OF RECYCLED MATERIALS

(76) Inventors: John Paul Schofield, 1847 Terrence Dr., Stafford, TX (US) 77477; Janet Ellen Schofield, 1847 Terrence Dr., Stafford, TX (US) 77477

( * ) Notice: Subject to any disclaimer, the term of this patent is extended or adjusted under 35 U.S.C. 154(b) by 74 days.

(21) Appl. No.: 12/317,315

(22) Filed: Dec. 22, 2008

Related U.S. Application Data

(60) Provisional application No. 61/008,994, filed on Dec. 26, 2007.

(51) Int. Cl.
*A47G 29/12* (2006.01)

(52) U.S. Cl. .............. 232/39; 232/38; 47/66.6

(58) Field of Classification Search ............ 232/38, 232/39, 17; D99/29–32; 47/39, 44, 66.6, 47/67, 65.5; D11/144, 148, 149; 248/146
See application file for complete search history.

(56) References Cited

U.S. PATENT DOCUMENTS

| | | | |
|---|---|---|---|
| 4,359,185 A | 11/1982 | Castro | |
| 4,498,621 A | 2/1985 | Diamond | |
| D291,937 S | 9/1987 | Fisher | |
| 4,712,731 A | 12/1987 | Gramelspacher | |
| 4,875,622 A * | 10/1989 | Lents | 232/39 |
| D312,912 S * | 12/1990 | Klahre | D99/29 |
| D313,105 S | 12/1990 | Klahre | |
| 5,035,356 A | 7/1991 | Granger | |
| D322,418 S | 12/1991 | White | |
| D331,481 S | 12/1992 | Barlow | |
| 5,361,977 A | 11/1994 | Ogrodnick, Jr. | |
| 5,664,729 A | 9/1997 | Ladewig | |
| D388,232 S | 12/1997 | Valentino | |
| 5,711,433 A * | 1/1998 | Smith | 211/71.01 |
| D398,134 S | 9/1998 | Taylor | |
| D414,309 S | 9/1999 | Okafor | |
| D417,798 S * | 12/1999 | Henson | D6/405 |
| 6,032,808 A | 3/2000 | Henson | |
| D427,412 S | 6/2000 | Klein | |
| 6,109,519 A | 8/2000 | McClure | |
| 6,123,257 A | 9/2000 | Guidicy | |
| D446,625 S | 8/2001 | Ballard et al. | |
| 6,296,180 B1 | 10/2001 | Blizzard | |
| D460,718 S | 7/2002 | Beattie | |
| 6,513,284 B1 * | 2/2003 | Sandlin | 47/66.6 |
| 6,539,665 B1 * | 4/2003 | Llona | 47/65.5 |
| D493,269 S | 7/2004 | Burgos et al. | |
| 6,772,938 B2 | 8/2004 | Martin et al. | |
| 6,962,284 B1 | 11/2005 | Hartelius et al. | |
| 7,086,581 B1 | 8/2006 | Lackey et al. | |
| 7,111,772 B2 | 9/2006 | MacNeill | |
| 7,163,140 B1 | 1/2007 | Kaiser | |
| 7,201,306 B1 * | 4/2007 | Lackey | 232/1 C |
| 7,328,835 B2 | 2/2008 | Menghini | |
| 2009/0278001 A1 * | 11/2009 | Sherburne | 248/146 |

* cited by examiner

*Primary Examiner*—William L. Miller

(57) ABSTRACT

A combination mailbox housing, pedestal and planter is constructed of recycled materials to be all in one unit. The pedestal is constructed from four expended five-gallon buckets, which are screwed together and covered with wire lath and stucco, and artificial plastic rocks which rocks have in turn been constructed from expended plastic bottles. The mailbox housing is constructed from used cedar fence boards in a board and batten style to enclose a standard metal or plastic mailbox. When the mailbox housing and pedestal is assembled into one unit and installed, soil is put into the planter sections of the pedestal wherein plants and/or flowers can be planted.

3 Claims, 6 Drawing Sheets

COMBINATION MAILBOX HOUSING AND PEDESTAL-PLANTER ASSEMBLY MADE OF RECYCLED MATERIALS

CROSS-REFERENCE TO RELATED APPLICATIONS

This application claims the benefit of provisional patent application Ser. No. 61/008,994, filed Dec. 26, 2007 by the present inventors.

This application uses the plastic rocks disclosed in our U.S. Pat. No. 7,115,178, granted Oct. 3, 2006.

FEDERALLY SPONSORED RESEARCH

Not applicable

SEQUENCE LISTING OR PROGRAM

Not applicable

BACKGROUND OF THE INVENTION

1. Field of the Invention

This invention generally relates to mailboxes and specifically to a combination mailbox housing, pedestal and planter.

2. Prior Art

Mailboxes located at residences have long been mounted in various ways.

Many homeowners have sought to use the appearance of the mailbox to enhance the aesthetic qualities of their homes. Many homeowners are also concerned with the environment and with recycling.

The present invention enables a solution to both of the above listed homeowner concerns as it provides a unique, attractive mailbox housing structure that is constructed mainly with recycled materials.

Previously, decorative mailbox covers have been proposed to improve the appearance of a plain metal mailbox mounted atop a wooden post and to protect the mailbox from adverse weather conditions.

U.S. Pat. No. 5,035,356 (1991), to Granger discloses a decorative natural wood covering structure overlying an out of doors, exposed mailbox. This covering is placed over a standard mailbox and covers the mailbox only. It does not enhance the appearance of the supporting post and landscape, nor does it address recycling of materials.

U.S. Pat. No. 6,032,808 (2000), to Hensen discloses an open framework supported on a mailbox, and the framework in turn supports multiple flowerpots whose plants decorate the mailbox. Again, this decorates the mailbox only and does not decorate the plain post. It does not protect the mailbox from adverse exposure to the elements. It does not address recycling.

Another type of mailbox has been the masonry mailbox, constructed of brick and/or masonry and designed to encase a standard metal or plastic mailbox in a protective shell. The masonry mailbox also provides a pleasing appearance to the property.

However, a traditional masonry mailbox must be built by skilled masons at much expense. Another disadvantage of the traditional masonry mailbox is that it generally requires the pouring of a three or four-inch cement slab which needs up to four days to dry, thus adding to time, material and labor costs.

The current inventors could find no reference in the prior art to the use of recycled materials to construct mailbox housings and/or covers.

Accordingly, several objects and advantages of our invention are to provide a combination mailbox housing, pedestal and planter which combines the advantages of a decorative mailbox housing, planter and masonry mailbox all in one unit, which is constructed almost completely from recycled materials.

Another object is to provide a mailbox housing unit that is easy and economical to install because it does not require a cement slab and/or skilled masons for installation.

A further object is to provide an artificial stone facade pedestal, which enhances the mailbox housing while supporting it and also ties into the appearance of the attached planter.

Another object is to provide a planter, which, when filled with dirt, helps anchor the whole mailbox unit to the ground and adds to the beauty of the landscape when different plants or flowers are planted therein.

A still further object is to construct the unit almost completely of recycled materials, which helps the environment.

Further objects and advantages will become apparent from the ensuing description and drawings.

SUMMARY

The present invention pertains to the construction of a combination mailbox housing, pedestal and planter all in one unit. The unit is made almost completely from recycled materials.

Accordingly, the pedestal and planter section is made from four used, empty five-gallon buckets screwed together and configured such that there are three buckets side by side on the bottom level. The middle bucket is turned upside down, and the fourth bucket is placed right side up on the top of the middle bottom bucket.

An anchor block for the mailbox housing is attached to the top of the top five-gallon bucket with four screws through the sides, (two on each side).

Tarpaper is placed over the indentations where the three bottom buckets meet and screwed to the buckets.

Metal lath, (wire mesh), is wrapped around the exposed areas of all four buckets and fastened with screws and washers.

Stucco is applied over the mesh and allowed to dry. Then artificial, plastic rocks as disclosed in U.S. Pat. No. 7,115,178 granted Oct. 3, 2006 to Schofield, (the present inventors), are installed onto all stuccoed areas of the pedestal just like real rocks would be.

A mailbox housing is constructed from recycled cedar fence boards in board and batten style in the general configuration of a barn. The housing is constructed on a wood base.

The housing is attached to the top of the completed stone façade pedestal and a standard mailbox is inserted into the housing and fastened to the wood base.

DETAILED DESCRIPTION ACCORDING TO THE PREFERRED EMBODIMENTS OF THE PRESENT INVENTION

Figure 1:
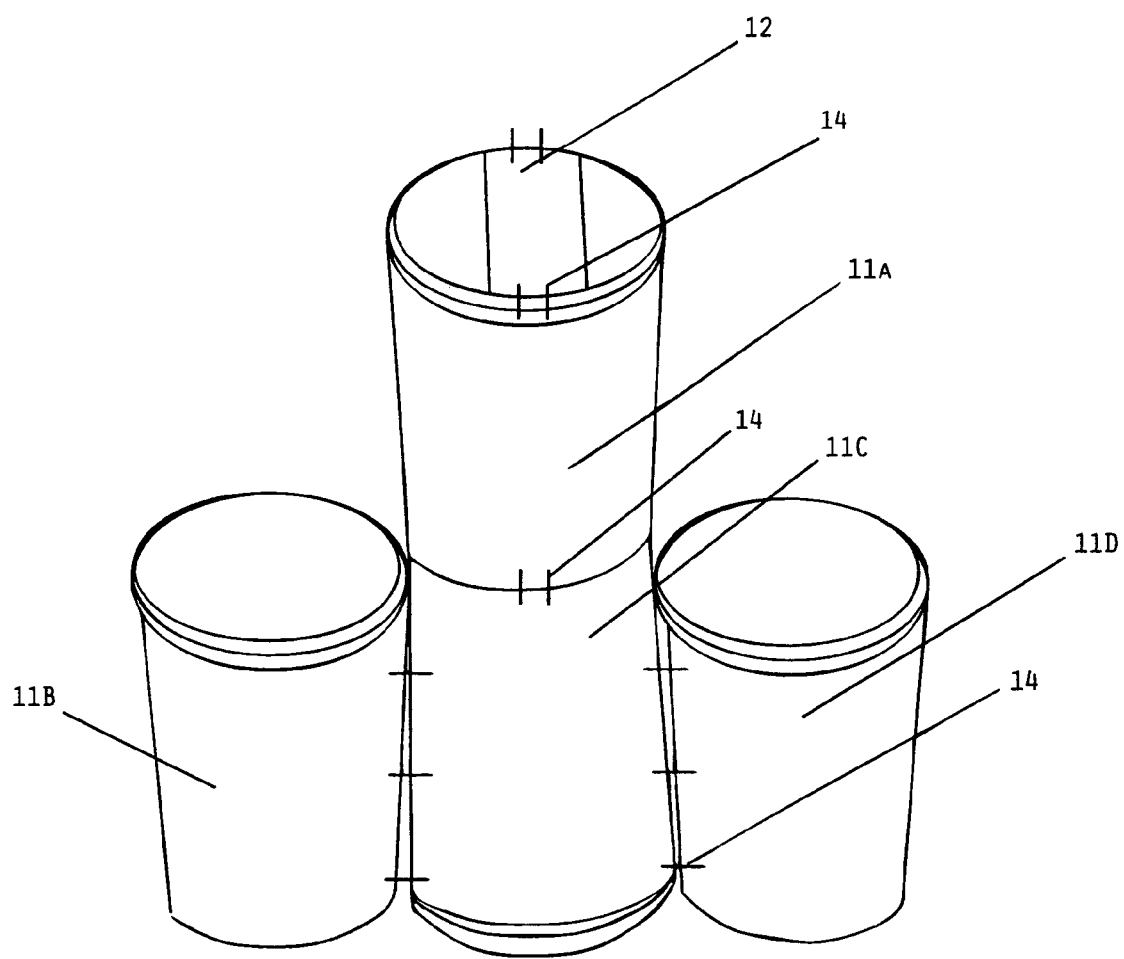
FIG. 1 is a front elevational view of the four empty plastic buckets screwed together according to our invention
Figure 6:
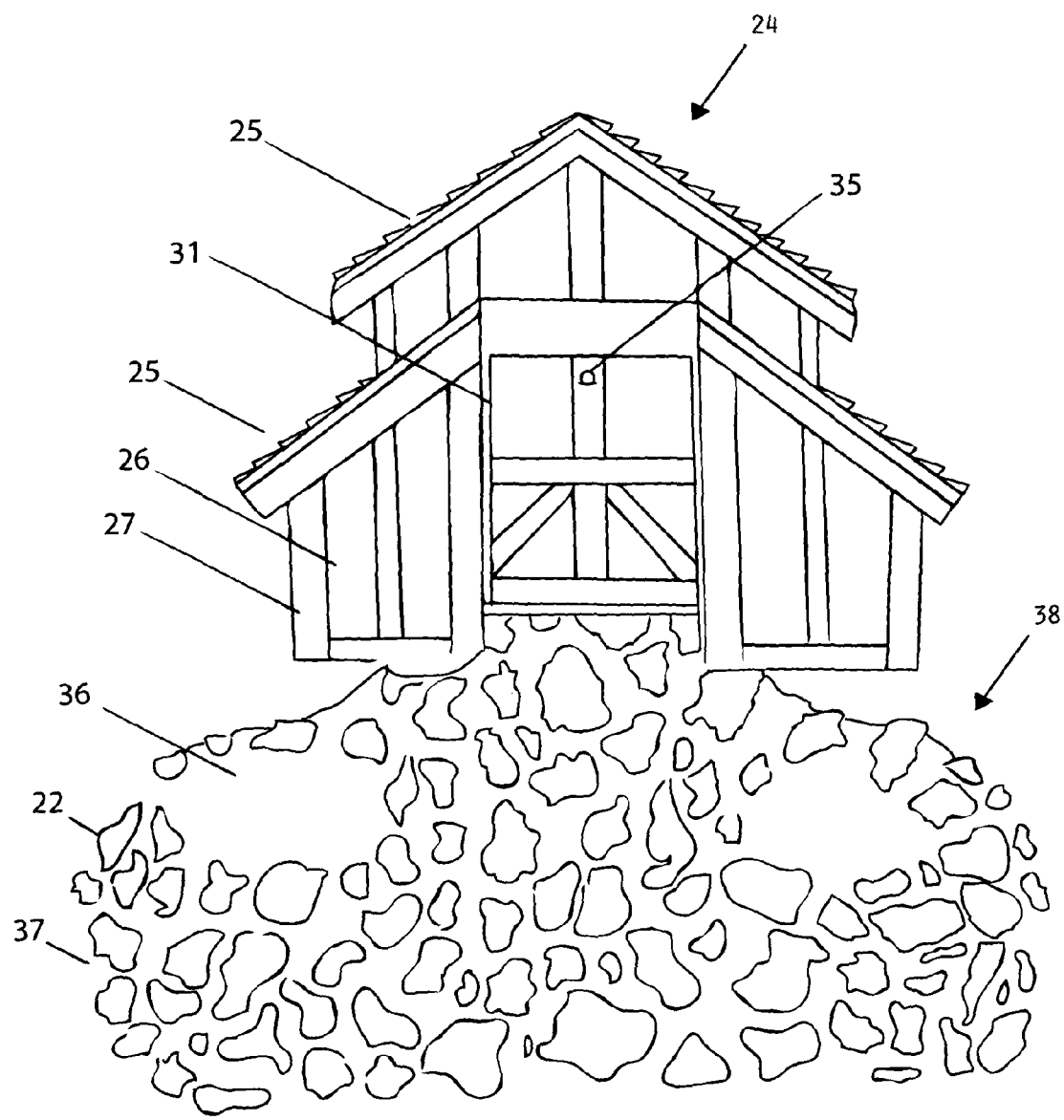
FIG. 6 is a front elevational view of the combination mailbox housing, pedestal and planter fully assembled according to our invention.

FIG. 1 shows four empty five-gallon plastic buckets, 11A, 11B,11C,11D, which form the basic structure for the pedestal 38 shown in FIG. 6. The buckets 11A,11B,11C,11D are screwed together with screws 14. In the preferred embodiment self-tapping, round head screws are used. The buckets are configured such that three buckets, 11B,11C,11D are placed side by side, and the middle bucket 11C is turned upside down. The fourth bucket 11A is placed right side up on top of the bottom middle bucket 11C and screwed to that bucket with screws 14. An anchor block 12 is screwed into the top of the top bucket 11A with four screws 14 through the sides, (two on each side). Preferably the anchor block 12 is a treated 2" by 8" wood block.

Figure 2:
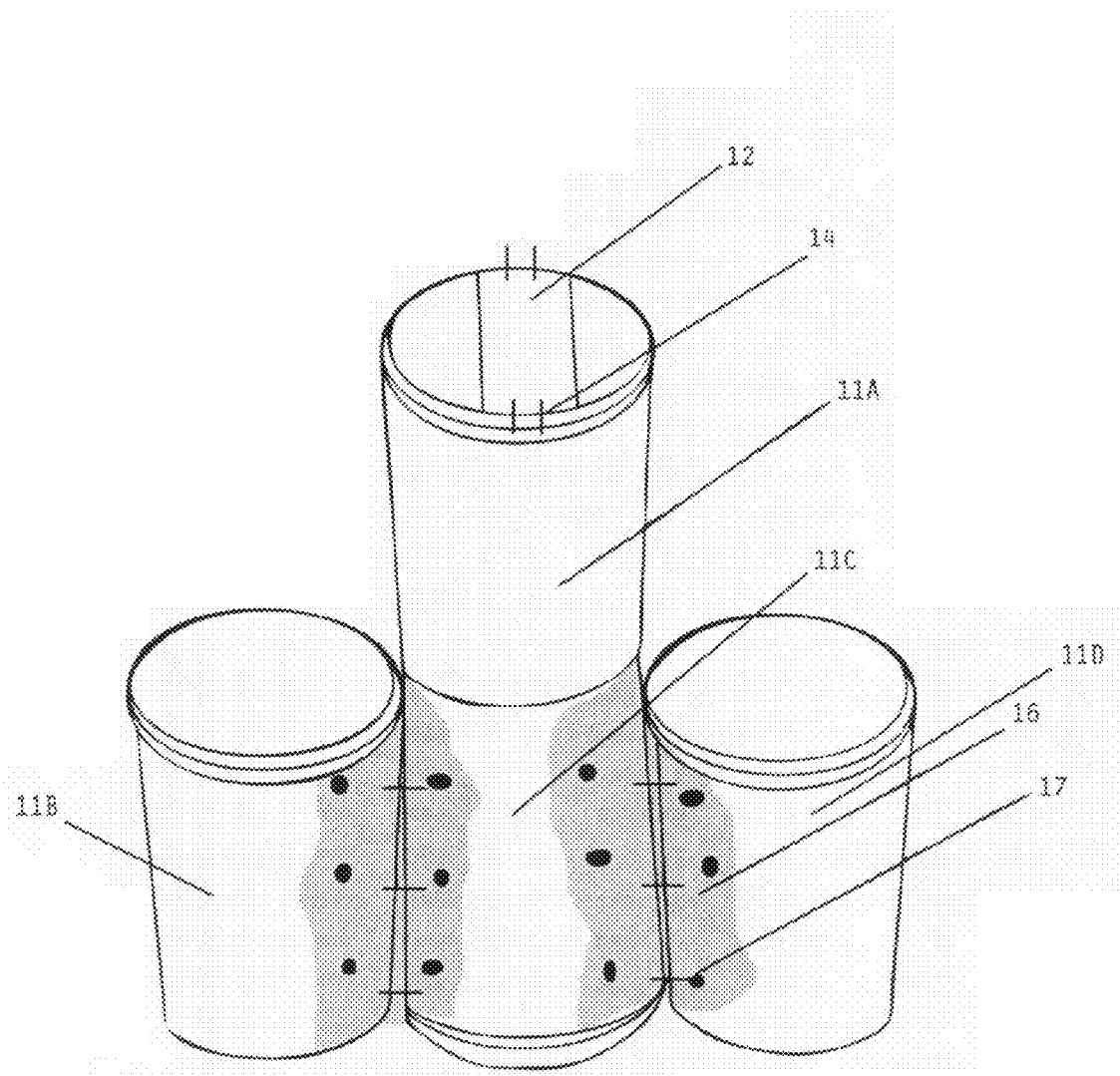
FIG. 2 is a front elevational view of the four empty plastic buckets screwed together and with tarpaper attached according to our invention.

After the buckets, 11A,11B,11C,11D have been screwed together and the anchor block 12 installed, tarpaper 16, as shown in FIG. 2 is placed over the indentations where the bottom buckets, 11B,11C,11D meet. The tarpaper 16 is screwed to the buckets 11B,11C,11D with flathead screws 17.

Figure 3:
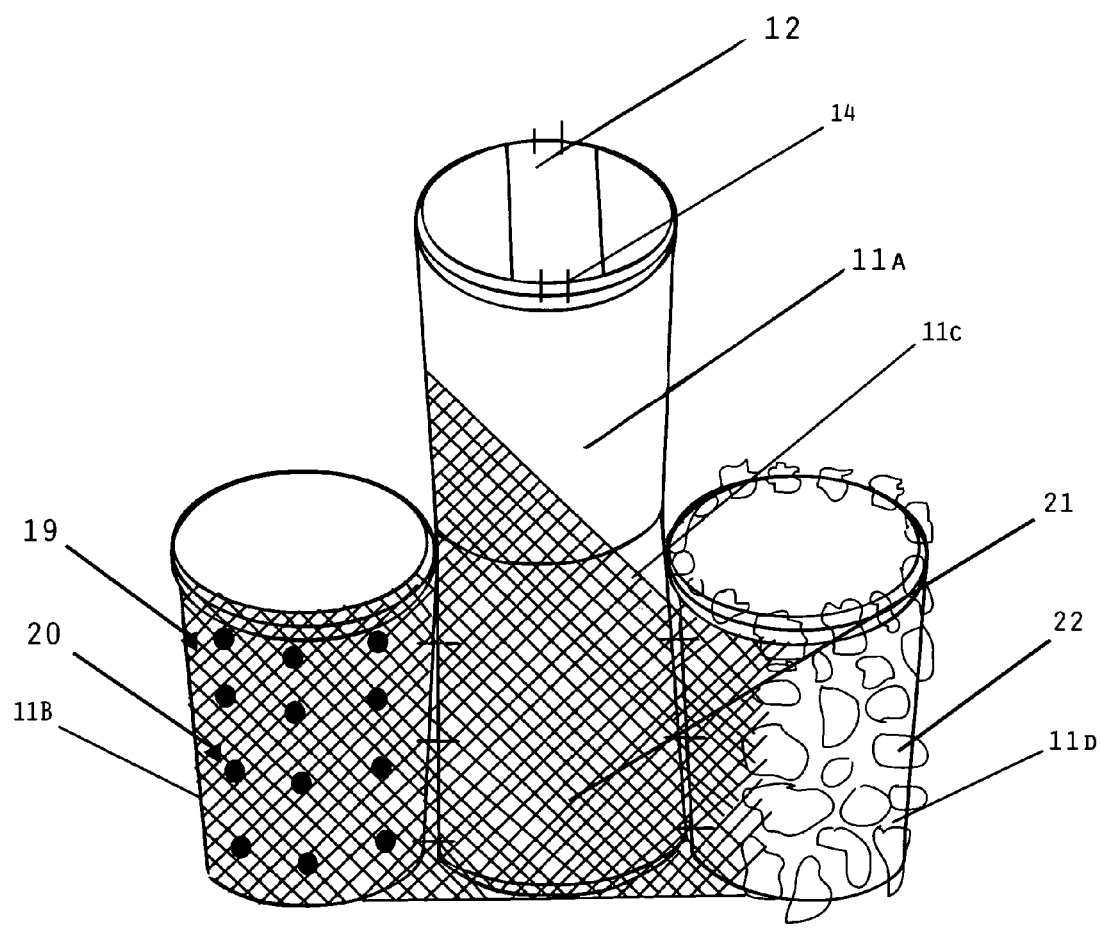
FIG. 3 is a front elevational view of the four buckets illustrating partially the wire mesh, stucco and plastic rocks on the buckets.

After the tarpaper 16 has been secured to the bottom buckets, 11B,11C,11D, wire lath 19, as shown in FIG. 3 is wrapped around the exposed areas of all four buckets 11A, 11B,11C,11D.

Note that the top bucket 11A can be filled with cleaned, crushed, expended food cans, thus further aiding the environment.

The wire lath 19 is fastened to the buckets 11A,11B,11C, 11D with lath screws 20 that have washers on them. Stucco 21 is then troweled on and allowed to dry, preferably for two days. Rocks 22 can now be installed. In the preferred embodiment the rocks 22 are the artificial plastic rocks of U.S. Pat. No. 7,115,178 issued Oct. 3, 2006 to the present inventors. The rocks 22 are installed using a mortar mix of sand and cement.

The rocks 22 are installed just like real rocks, one at a time. The mortar mix is placed on the back of a rock 22 and the rock is now placed on top of the stucco 21. Another rock 22 is installed the same way. Then more mortar is put between the two rocks 22 and shaped with a shaping tool (not shown). This process is continued until the pedestal 38 is completely covered with rocks. It will be understood by those skilled in the art that there are various ways to install the rocks.

The above description is for illustrative purposes of the preferred embodiment and variations may be made without limiting or departing from the scope of the invention.

Figure 4:
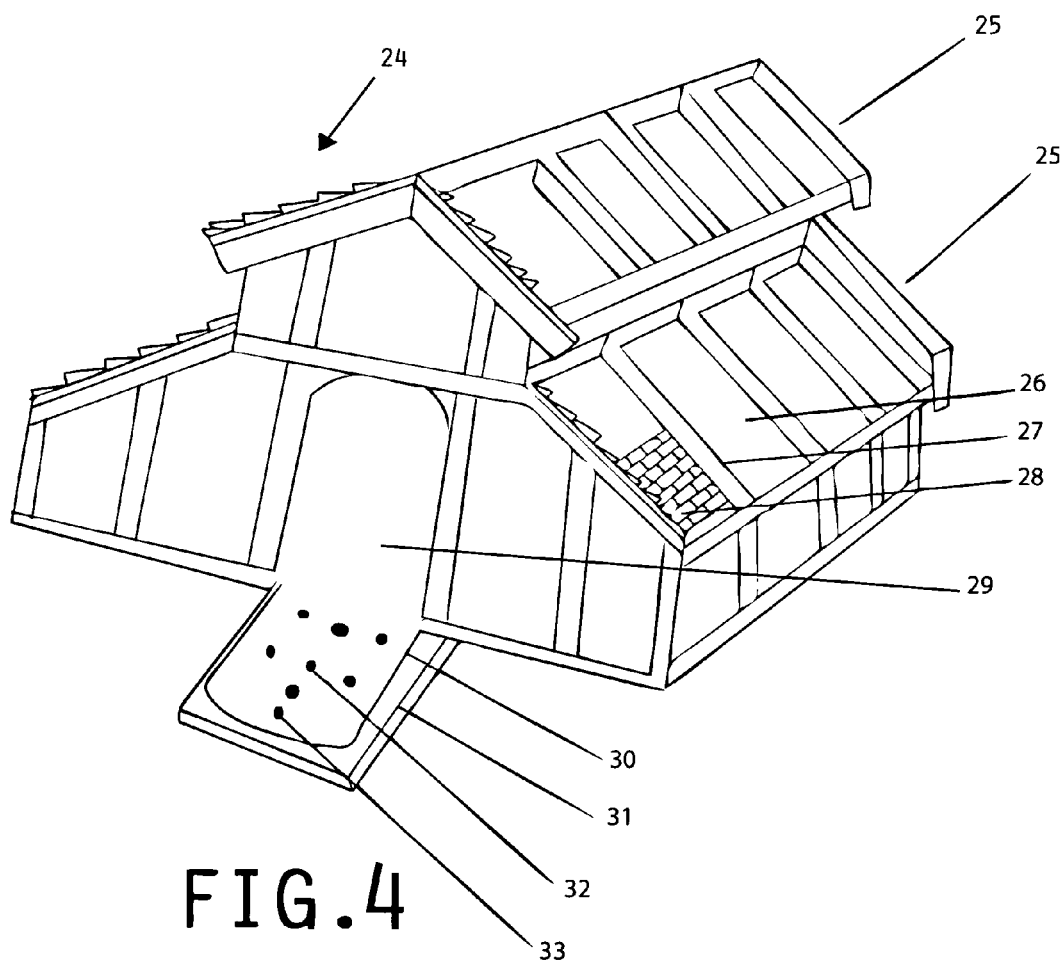
FIG. 4 is a somewhat perspective of the mailbox housing of our invention
Figure 5:
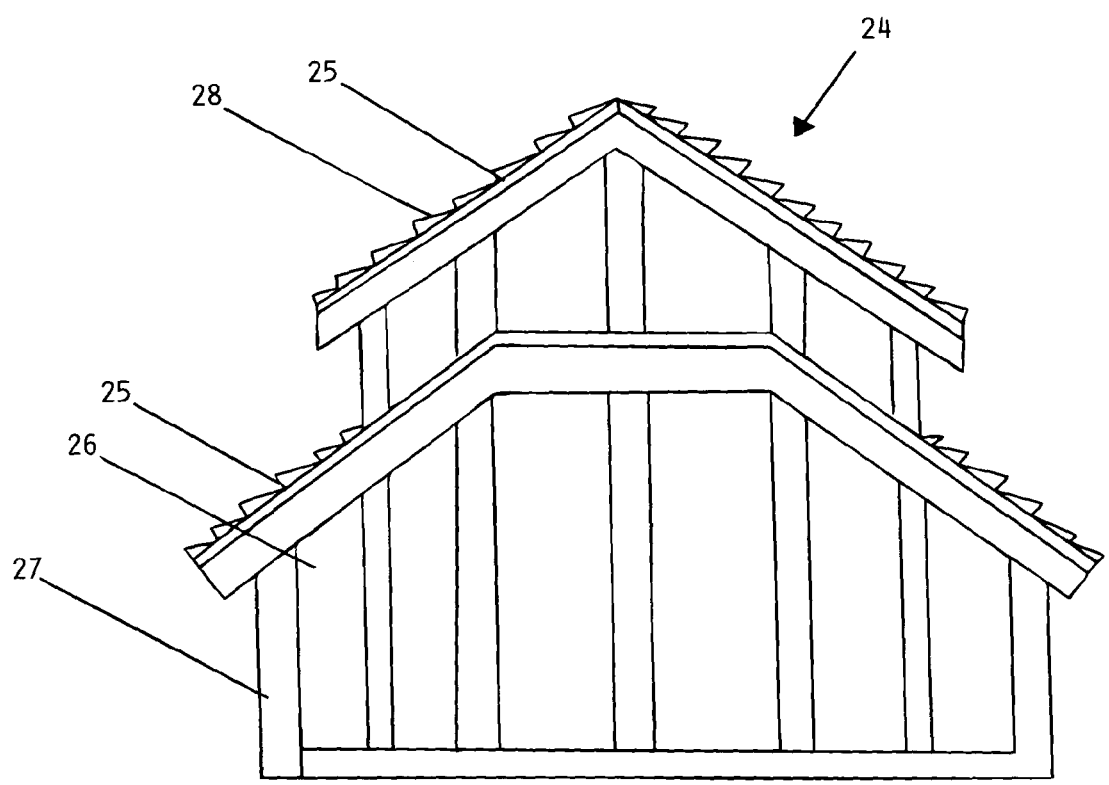
FIG. 5 is a back elevational view of the mailbox housing of our invention

FIG. 4 shows a somewhat perspective view of the mailbox housing 24 of our invention. The mailbox housing 24 is constructed of recycled cedar fence boards on a wood base (not shown). In the preferred embodiment the mailbox housing 24 is constructed in a barn shape in a board 26 and batten 27 style, as well known to the art. The mailbox housing 24 has a two-tiered roof 25. Shingles 28 may be installed on the roof 25 for a more realistic look but are not necessary to the invention. An opening 29 is left on the front of the housing 24 to receive a standard metal mailbox (not shown). Before the standard mailbox is inserted into the housing 24, a wooden door 31 is screwed onto the face of the existing metal door 30 of the standard mailbox with screws 32 and two nuts and bolts 33 to hold the catch 35 on.

Now the housing 24 is screwed down into the anchor block 12 of FIG. 1 preferably using a screwdriver with a 45-degree angle adjustment (not shown). The metal mailbox is now inserted into the housing 24 and screwed to the wood base also using a screwdriver with a 45-degree angle adjustment. The mailbox housing 24 and pedestal 38 are now one unit as shown in FIG. 6.

Dirt can be put in the planter areas 36 and plants or flowers planted to further enhance the beauty of the home and landscaping area. The rocks 22 of the pedestal area 38 can be stained to the color(s) desired by the homeowner.

While our above description contains many specificities, these should not be construed as limitations on the scope of the invention, but rather as exemplifications of one preferred embodiment thereof. Many variations are possible, such as different ways to install the rocks on the pedestal and different styles of architecture for the mailbox housing.

Accordingly, the scope of the invention should be determined not by the embodiment(s) illustrated, but by the appended claims and their legal equivalents.

We claim:

1. A combination mailbox housing and pedestal-planter assembly comprising:
   a) three expended five-gallon buckets screwed together side by side such that the middle bucket of the three buckets is upside down;
   b) a fourth expended five-gallon bucket screwed onto the top of the middle bucket;
   c) an anchor block secured to the top of the fourth bucket;
   d) tarpaper attached to spaces in between the three bottom buckets;
   e) metal lath covering the exposed areas of the four buckets that are screwed together;
   f) stucco applied on the metal lath;
   g) artificial plastic rocks installed on the stucco; and
   h) a mailbox housing including four walls and a roof, a front wall of the four walls having an opening for receiving a standard mailbox, wherein the assembled buckets define a pedestal-planter and the mailbox housing is screwed onto the anchor block to secure the mailbox housing to the pedestal-planter.

2. The combination mailbox housing and pedestal-planter assembly of claim 1, comprising: a wood door attached to a door of the standard mailbox, and the standard mailbox positioned within the housing.

3. A method of building a combination mailbox and pedestal-planter assembly comprising the steps of:
   a) screwing three expended five-gallon buckets together side by side such that the middle bucket of the three buckets is upside down;
   b) screwing a fourth expended five-gallon bucket onto the top of the middle bucket;
   c) securing an anchor block to the top of the fourth bucket;
   d) attaching tarpaper to spaces in between the three bottom buckets;
   e) covering the exposed areas of the four buckets that are screwed together with metal lath;
   f) applying stucco on the metal lath;
   g) installing artificial plastic rocks on the stucco, whereby the assembled buckets define a pedestal-planter;
   h) building a mailbox housing that comprises four walls and a roof, a front wall of the four walls having an opening for a standard mailbox;
   i) installing the mailbox housing onto the pedestal-planter by means of screwing said mailbox housing onto the anchor block;
   j) attaching a wood door to a door of the standard mailbox; and
   k) inserting the standard mailbox into the housing.

* * * * *